(12) United States Patent
Lüttig et al.

(10) Patent No.: US 7,686,249 B2
(45) Date of Patent: Mar. 30, 2010

(54) INTEGRAL FRAME MEMBER FOR AN AIRCRAFT

(75) Inventors: Helmut Lüttig, Hamburg (DE); Carsten Paul, Garstedt (DE)

(73) Assignee: Airbus Deutschland GmbH (DE)

( * ) Notice: Subject to any disclaimer, the term of this patent is extended or adjusted under 35 U.S.C. 154(b) by 1052 days.

(21) Appl. No.: 10/551,019

(22) PCT Filed: Mar. 29, 2004

(86) PCT No.: PCT/EP2004/003308

§ 371 (c)(1),
(2), (4) Date: Feb. 23, 2006

(87) PCT Pub. No.: WO2004/085247

PCT Pub. Date: Oct. 7, 2004

(65) Prior Publication Data
US 2006/0237587 A1  Oct. 26, 2006

(30) Foreign Application Priority Data
Mar. 28, 2003  (DE) ................................ 103 14 039

(51) Int. Cl.
 *B64C 1/06* (2006.01)
(52) U.S. Cl. ..................................... 244/119
(58) Field of Classification Search ................. 244/119, 244/120, 123.1; 52/630
See application file for complete search history.

(56) References Cited

U.S. PATENT DOCUMENTS

| 1,851,211 | A |   | 3/1932  | Ragsdale |         |
|-----------|---|---|---------|----------|---------|
| 2,451,454 | A | * | 10/1948 | Watter   | 29/469  |
| 3,356,480 | A | * | 12/1967 | Golightly | 65/103 |
| 5,430,758 | A | * | 7/1995  | Gillhaus | 373/153 |
| 5,451,377 | A | * | 9/1995  | Asher et al. | 428/167 |
| 5,518,208 | A |   | 5/1996  | Roseburg |         |
| 6,306,239 | B1 | * | 10/2001 | Breuer et al. | 156/245 |
| 6,378,805 | B1 |  | 4/2002  | Stephan et al. |    |
| 6,496,745 | B1 |  | 12/2002 | Killian  |         |
| 6,511,570 | B2 | * | 1/2003  | Matsui   | 156/245 |
| 6,684,593 | B2 | * | 2/2004  | Brenneis et al. | 52/630 |
| 2001/0015043 | A1 |  | 8/2001 | Brenneis et al. |   |

FOREIGN PATENT DOCUMENTS

| DE | 35 31 028 A1 | 3/1987 |
| DE | 36 32 288 A1 | 4/1988 |
| EP | 1 245 317 A1 | 10/2002 |

* cited by examiner

*Primary Examiner*—Tien Dinh
(74) *Attorney, Agent, or Firm*—Lerner, David, Littenberg, Krumholz & Mentlik, LLP

(57) ABSTRACT

According to an exemplary embodiment of the present invention, a frame member for an aircraft is provided comprising a clip region and a frame region. According to an aspect of this exemplary embodiment of the present invention, the clip region, shear web region and the frame region are integrated into the frame member and be formed from an extrusion mold by a milling process. Advantageously, this allows for a reduced number of individual elements for forming a frame member and provides the flexibility of variation of the forms and dimensions of a frame member for an aircraft.

12 Claims, 2 Drawing Sheets

INTEGRAL FRAME MEMBER FOR AN AIRCRAFT

BACKGROUND OF THE INVENTION

The present invention relates to support structures of an aircraft and in particular to a frame of the aircraft. In particular, the present invention relates to a frame member for an aircraft, to an aircraft comprising a frame member and to methods of manufacturing a frame member.

In today's aircrafts, the frames usually consist of a plurality of individual elements. Usually, more than 10 individual parts are glued, riveted, clipped and/or screwed together. In particular, the clips and the shear webs for connecting the skin and the stringers of the aircraft to the frame are connected to the frame by rivets. Reinforcement straps or angles are usually glued or riveted to the frame. Due to this complex construction, the manufacturing of such frames is time consuming and complex.

Furthermore, the assembly was complicated and ineffective due to the necessity of connecting a plurality of individual elements for forming one frame. The frame itself usually made from bended sheet metal or extruded profiles and had a fixed thickness and fixed dimensions which disadvantageously didn't allow for any flexibility, for example, for reinforcements in areas where increased stress was applied to the frame and smaller dimensions where less stress was applied. Also, no flanging holes could be made into the frame due to the danger of cracks. Due to this, system lines, such as electric cables and/or pipes are usually arranged on the frame i.e. between the frame on the inner cover of the aircraft body.

SUMMARY OF THE INVENTION

According to an exemplary embodiment of the present invention, a frame member for an aircraft is provided comprising a clip region and a frame region. According to an aspect of this exemplary embodiment of the present invention, the clip region and the frame region are integral. This may allow for a simple assembly of the frame. Furthermore, this may allow for a frame member having a simple design and construction which may be produced at low cost. Also, for example due to fact that no connection elements such as rivets have to be provided, the frame member according to this exemplary embodiment of the present invention may have a reduced weight.

According to another exemplary embodiment of the present invention, a plurality of clip regions are provided for forming a shear web region for supporting a skin of an aircraft. The clip region, the shear web region and the frame region are one piece.

The provision of a "one piece", frame member may allow for an improved handling during assembly of the aircraft. Furthermore, a quality control of the frame member can be made more efficiently, since a reduced number of connections have to be tested.

According to another exemplary embodiment of the present invention, the frame member is formed from one extrusion molded profile. This may allow for a very simple manufacture of the frame member. According to an aspect of this exemplary embodiment of the present invention, the one extrusion molded profile used for forming the frame member is designed such that all variances i.e. form and dimension changes occurring for such frame member are taken into consideration. In other words, for manufacturing the frame member according to this exemplary embodiment of the present invention, only one "raw material" is needed, namely the extrusion molded profile. From this one extrusion molded profile, frame members having different dimensions and forms may be formed. Furthermore, from this extrusion molded profile, a one piece frame member including a clip region, a shear web region and a frame region may be formed.

According to another exemplary embodiment of the present invention, the frame member is formed from the one extrusion molded profile by a milling process. This may allow for a very fast and efficient manufacturing of the frame member. Furthermore, due to today's milling technology, a very accurate manufacturing may be provided which may largely be automatised, for example by a computer added milling.

Furthermore, due to the milling, at least one of a form, thickness and dimension of the different regions of the frame member may simply be realized by a suitable milling. Advantageously, this allows, for example, to have a frame region having an increased thickness for locations in the aircraft where an increased stress is applied to the frame member and on the other hand to have portions of the frame member having a reduced thickness for the application in locations of the aircraft where less stress is applied to the frame member. This may allow for an increased design flexibility and may allow to further reduce a weight of the frame member.

According to another exemplary embodiment of the present invention, a cut out is formed in at least one of the clip region, the shear web region and the frame region, for example, for accommodating at least one of electrical lines, pipes and system lines or to reduce the weight of the frame member. Due to the arrangement of the lines "in" the frame member, a very efficient use of space may be provided. Furthermore, in comparison to aircrafts where the lines were usually arranged on the inside of the frame member, an improved safety may be provided since the lines are better protected from, for example, an impact or a bash.

According to another exemplary embodiment of the present invention, the cut out is provided with a border reinforcement which allows to avoid cracks in a region surrounding the cut out. This may allow for an improved durability of the frame member. Furthermore, this may allow for an improved security due to the fact that cracks may be avoided. Advantageously, the border reinforcement is formed by a milling which allows for a flexible and fast formation of the border reinforcement. Advantageously, due to the fact that the border reinforcement is milled into the extrusion molded profile, the border reinforcement also is part of the "one piece" frame member.

According to another exemplary embodiment of the present invention, the clip region is adapted for connection to a stringer of the aircraft. This may allow for a direct connection of the frame member with a support bracket to the stringer in comparison to known systems where the frame was connected to a clip and the clip was then connected to the stringer. This may allow for an improved durability and may allow a different thickness and form of the stringer support bracket.

According to another exemplary embodiment of the present invention, the shear web region of the frame member is adapted for supporting a skin of the aircraft. For example, a base may be provided on the shear web region for providing a support for the skin.

According to another exemplary embodiment of the present invention, an aircraft is provided comprising a frame member according to one of the above exemplary embodiments.

According to another exemplary embodiment of the present invention, a method of manufacturing a frame member having a clip region, a shear web region and a frame region is provided. According to this exemplary embodiment of the present invention, firstly a mold is manufactured. Then, the clip region, the shear web region and the frame region of the frame member or at least one of these regions is manufactured by performing a milling of the mold. Advantageously, this allows for a very fast cheap and efficient manufacturing method for manufacturing a one piece frame member. In other words, according to this exemplary embodiment of the present invention, a frame member is manufactured where the clip region, the shear web region and the frame region are integral parts of the frame member.

According to another exemplary embodiment of the present invention, the mold is manufactured by extrusion molding which allows for a simple and reliable manufacturing of the mold.

According to another exemplary embodiment of the present invention, at least one of the clip region, the shear web region and the frame region has varying first dimensions varying between a minimum and a maximum. In other words, the frame member according to this exemplary embodiment of the present invention may have different form and/or dimensions in different locations of the frame member. According to this method, the mold is manufactured such that these different dimensions and/or forms are taken into consideration i.e. the mold is manufactured such that a second dimension of the mold essentially coincides with the maximum. Due to the fact that the mold is manufactured such that all variations of the frame member planned may be formed into the mold by milling, a very simple efficient and flexible manufacturing method is provided. Also, since only one starting material is needed namely the pre-manufactured mold, the manufacturing process may be made more reliable since a mistaken use of a wrong starting material may be avoided.

According to another exemplary embodiment of the present invention, before the milling is performed for forming the particular regions of the frame member, the mold is bent. In particular, the mold may be bent for adapting a curvature of the frame member to a curvature of the skin of the aircraft. The bending may be performed by a stretch forming process.

It may be seen as the gist of an exemplary embodiment of the present invention that an integral frame member is provided where a clip, a shear web and a frame region are one piece or, in other words, where the clip and the shear web region for allowing a connection to a skin and a stringer of an aircraft, and the frame itself are integrated into one part. Advantageously, this frame member may be formed from an extrusion mold by a milling process.

BRIEF DESCRIPTION OF THE DRAWINGS

These and other aspects of the present invention will become apparent from and will be elucidated with reference to the embodiments described hereinafter.

Exemplary embodiments of the present invention will be described in the following, with reference to the following drawings.

DETAILED DESCRIPTION

In the following description of FIGS. 1-4, the same reference numerials are used to designate the same or corresponding elements.

Figure 1:
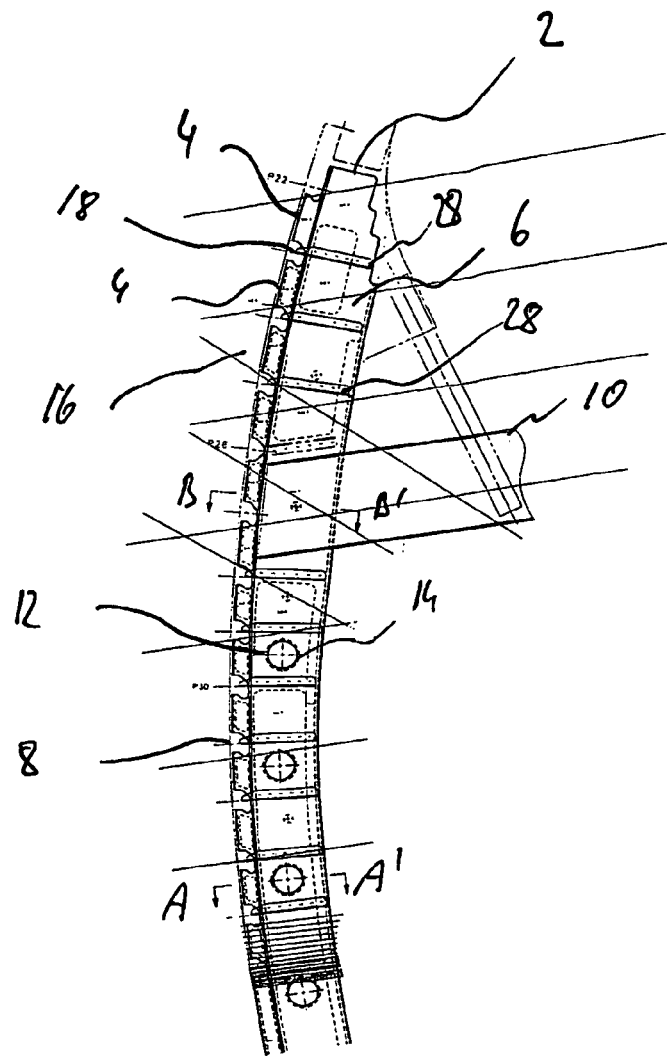
FIG. 1 shows a side view of an exemplary embodiment of a frame member according to the present invention.

FIG. 1 shows a cross-sectional view of a frame member 2 according to an exemplary embodiment of the present invention. As may be taken from FIG. 2, the frame member 2 comprises a frame region 6. The frame region 6 is designed and adapted to provide for a structural support of a structure of the aircraft. The frame region 6 has a curvature adapted to a cross-section of a body of the aircraft. On the frame region 6, there are provided a plurality of clip regions 4 which may also be referred to as clips. The plurality of clip regions 4 form a shear web region 16. The shear web region 16 is provided for supporting a skin 8 of the aircraft. Between two clip regions 4, there is provided a cut out 18 for the stringer. At the location of the cut out 18, there may be provided a stringer support bracket 28. The clip region 4 and/or the stringer support brackets 28 are adapted for connection to a stringer of the aircraft.

Reference numerial 10 in FIG. 1 designates a support which may be riveted to the frame region 6. Reference numerial 12 in FIG. 1 designates a cut out which may be provided in the frame member. The cut out 12 may be provided in the frame region 6. However, it may also be possible to provide cut outs in the clip region or the shear web region. The cut out 12 may be adapted to accommodate system lines of the aircraft such as electrical lines, pipes and communication lines. This may allow for a very space and weight saving arrangement of the system lines because of shortening the length of the system routing. Furthermore, due to the fact that the system lines are accommodated between the frame members, the system lines are very well protected from impacts or bashes which may allow for an improved safety.

Advantageously, the cut out 12 reduces the weight of the frame member and is provided with a border reinforcement which advantageously may allow to avoid for cracks in the region surrounding the recess. This may allow for an improved reliability and durability of the frame member.

Figure 2:
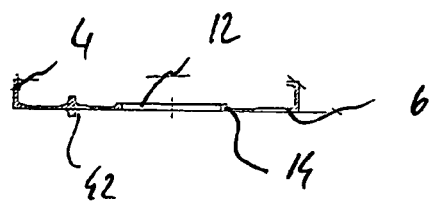
FIG. 2 shows a cross-sectional view taken along AA' in FIG. 1.

FIG. 2 shows a cross-sectional view of the frame member of FIG. 1 taken along line AA—in FIG. 1. As may be taken from FIG. 2, the cross-sectional form of the frame member is a single T form with one flange of the end 40 is cut away. The clip region 4 as indicated above is provided with a support for supporting the skin 8 of the aircraft. The frame region 6 may be provided with a region having an increased thickness for allowing for a strength and durability of the frame member. Due to a variation of a thickness of particular regions of the frame member, the frame member may flexibly be adapted to stresses applied at particular locations. Due to this, a frame member may be provided having an increased strength while having a low weight. In comparison to a known frame member consisting, as described above, of sometimes more than 10 individual pieces, for aircraft such as the Airbus 380 family, the weight may be reduced by 6.2 kg for each frame member.

As may be taken from FIG. 2, the cut out 12 may be provided with a border reinforcement 14. Furthermore, a rim 42 may be provided allowing for an improved stability.

Figure 3:
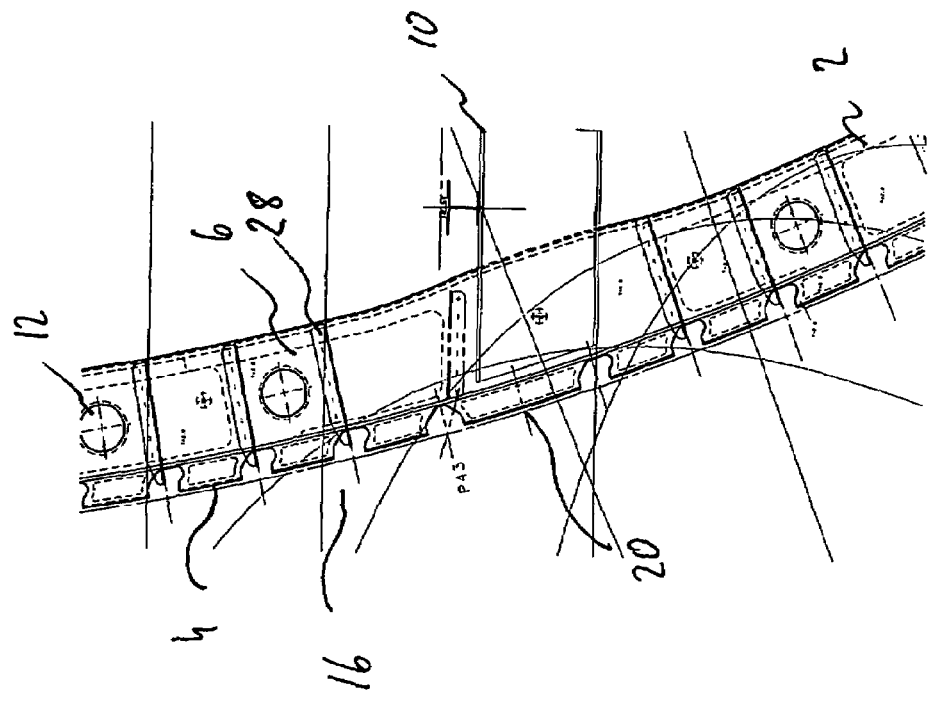
FIG. 3 shows a side view of an exemplary embodiment of a frame member according to the present invention.

FIG. 3 shows another side view of an exemplary embodiment of a frame member according to the present invention. As may be taken from FIG. 3, for example at the location 20, where a support 10 is attached to the frame member 2, the clip region 4 may be elongated and the height of the frame member 2 may be increased too. This may allow for more space for a connection between the support 10 and the frame member 2.

Figure 4:
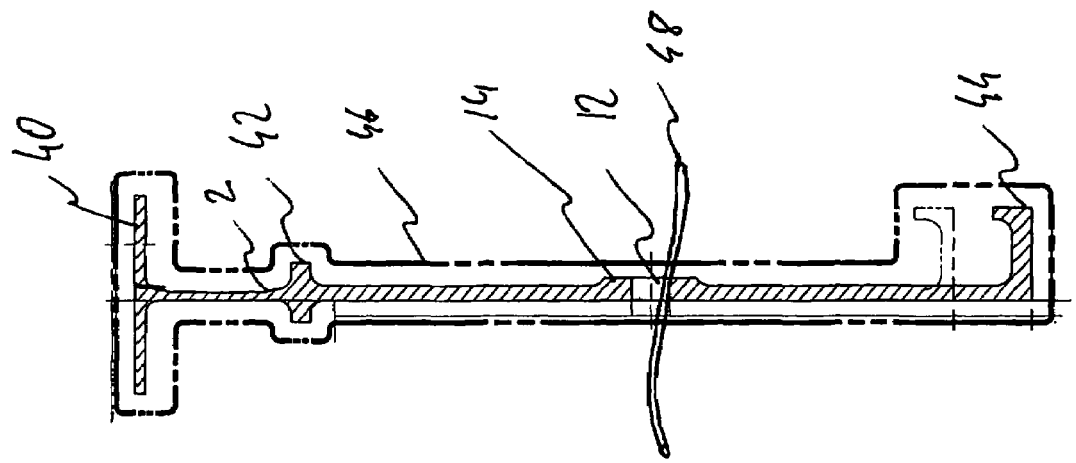
FIG. 4 shows a cross-sectional view of an extrusion molded profile according to an exemplary embodiment of the present invention where a cross-sectional view of the frame member taken along line BB' in FIG. 1 is projected.

FIG. 4 shows a cross-sectional view of an extrusion molded profile 46 according to an exemplary embodiment of the present invention. In this cross-sectional view of the extrusion molded profile 46, a cross-section of a frame member according to an exemplary embodiment of the present invention such as, for example, taken along line BB' in FIG. 1 is shown. As may be taken from FIG. 4, the extrusion molded profile 46 according to this exemplary embodiment of the present invention is formed such that all form and/or dimension changes of the frame member 2 occurring for this particular type of frame member may be covered. For example, an end 40 of the frame member 2 facing to an outside of the aircraft may have an L structure as shown in FIG. 2 but also may have a T structure as shown in FIG. 4. Also, the end 40 may have dimensions up to the bold line indicating the outer circumference of the extrusion molded profile 46. Also, the rim 42 may have different dimensions or may be even cut away.

As may be taken from FIG. 4, a thickness of the material, for example between end 40 and rim 42, may be reduced too, for example, allow for a further reduction of the weight of the frame member 2. The cut out 12 provided with the border reinforcement 14 may also have different dimensions and may by this be adapted for accommodating, for example, a system line 48. The end 40 of the frame member 2 as indicated with reference to FIG. 4 may be provided with a support for the skin 8 of the aircraft. As indicated in FIG. 4, a height of the frame member 2 may be varying. The end 44 may be provided with a rim allowing for an improved stability. The end 44 may have an L structure as shown in FIG. 4 but also may have other forms e.g. a T structure.

According to an exemplary embodiment of the present invention, the frame member according to the present invention may be manufactured as follows. Firstly, one profile is made covering all form and/or dimensions variances of the desired frame member. Advantageously, as indicated above, the profile may be manufactured by an extrusion molding process. Then, for adapting a curvature of the frame member to the curvature of the cross-section of the body of the aircraft, the mold is bent accordingly. Advantageously, the bending is performed by a stretch forming process. Then, subsequently to the stretch forming process, a milling process is performed for forming the frame member. As may be taken from FIGS. 1-4, the milling process may flexibly adapt a form and/or dimension of the frame member to the requirements at the location where the frame member is to be assembled to the aircraft. Advantageously, this may allow for a simple manufacturing of a frame member where the function of the clip, of the shear web, and of the frame are integrated into one piece. Advantageously, this allows for a combination of an extrusion molded profile and of a milling process. Furthermore, the number of individual elements for forming the frame member may be reduced significantly in comparison to the prior art where up to 10 individual elements are combined for forming the frame member. The frame members are usually dimensioned with respect to a fatigue. Advantageously, due to the above described manufacturing method, a 2xxx material may be used which in combination with the above manufacturing and the construction of the frame member according to the present invention may allow for higher fatigue stresses. According to another exemplary embodiment of the present invention, the frame member may be made from aluminium alloy such as, for example, Al—Li.

Furthermore, according to an exemplary embodiment of the present invention, a cut out may be provided in regions of the frame member. Advantageously, this may allow for an integration of system lines into the frames. In other words, in addition to the support function of the frame member, the frame member may also serve as support for system lines.

The invention claimed is:

1. A method of manufacturing a frame member having a clip region, a shear web region and a frame region, the method comprising:
   manufacturing a mold by extrusion molding;
   bending the mold by a stretch forming process; and
   subsequently to the stretch forming process, forming the clip region, the shear web region and the frame region of the frame member by a milling of the mold.

2. The method of claim 1, wherein at least one of the clip region, the shear web region and the frame region, has varying first dimensions varying between a minimum and a maximum; and
   manufacturing the mold such that a second dimension of the mold essentially coincides with the maximum.

3. The method of claim 1, wherein the clip region and the frame region are integral.

4. The method of claim 3, further comprising:
   providing a plurality of clip regions forming a shear web region; and
   wherein the clip region, the shear web region and the frame region are formed as one piece.

5. The method of claim 3, further comprising:
   forming the frame member from one extrusion molded profile.

6. The method of claim 5, wherein the one extrusion molded profile is formed by a milling process.

7. The method of claim 4, wherein the shear web region is also adapted for supporting skin of the aircraft.

8. The method of claim 1, further comprising:
   forming a cut out in at least one of the clip region, the shear web region and the frame region for accommodating at least one of electrical lines, pipes and system lines or for reduction of the weight.

9. The method of claim 8, further comprising:
   providing a border reinforcement for the cut out; and
   wherein the border reinforcement is formed by milling.

10. The method of claim 1, further comprising:
    adapting the clip region for connection to at least one of a stringer and skin of an aircraft.

11. The method of claim 1, wherein the frame is manufactured for use in an aircraft.

12. The method of claim 1, wherein the frame member is made from metal.

* * * * *

UNITED STATES PATENT AND TRADEMARK OFFICE
CERTIFICATE OF CORRECTION

PATENT NO. : 7,686,249 B2  
APPLICATION NO. : 10/551019  
DATED : March 30, 2010  
INVENTOR(S) : Helmut Luettig and Carsten Paul Page 1 of 1

It is certified that error appears in the above-identified patent and that said Letters Patent is hereby corrected as shown below:

Title Page, Item (57), Line 7, "and be formed" should read --and are formed--

Col. 1, Line 22, insert --was-- after "frame itself"

Col. 1, Line 30, insert --,-- after "pipes"

Col. 2, Line 44, insert -- - -- between "extrusion molded"

Col. 3, Line 2, "firstly" should read --first--

Col. 3, Line 18, delete "varying" before "first dimensions"

Col. 3, Line 31, insert --,-- after "needed"

Col. 3, Line 39, insert -- - -- between "stretch forming"

Col. 4, Line 31, insert --of-- after "shortening"

Col. 4, Line 35, delete "an" before "improved safety"

Col. 4, Line 39, delete "an" after "may allow for"

Col. 4, Line 44, delete "is" before "cut away"

Col. 4, Line 47, delete "a" after "allowing for"

Col. 4, Line 60, delete "an" before "improved stability"

Signed and Sealed this
Nineteenth Day of June, 2012

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,686,249 B2 | Page 1 of 2 |
| APPLICATION NO. | : 10/551019 | |
| DATED | : March 30, 2010 | |
| INVENTOR(S) | : Helmut Luettig and Carsten Paul | |

It is certified that error appears in the above-identified patent and that said Letters Patent is hereby corrected as shown below:

Title Page, Item (57), Line 7, "and be formed" should read --and are formed--

In the Specifications:

Col. 1, Line 22, insert --was-- after "frame itself"

Col. 1, Line 30, insert --,-- after "pipes"

Col. 2, Line 44, insert -- - -- between "extrusion molded"

Col. 3, Line 2, "firstly" should read --first--

Col. 3, Line 18, delete "varying" before "first dimensions"

Col. 3, Line 31, insert --,-- after "needed"

Col. 3, Line 39, insert -- - -- between "stretch forming"

Col. 4, Line 31, insert --of-- after "shortening"

Col. 4, Line 35, delete "an" before "improved safety"

Col. 4, Line 39, delete "an" after "may allow for"

Col. 4, Line 44, delete "is" before "cut away"

Col. 4, Line 47, delete "a" after "allowing for"

Col. 4, Line 60, delete "an" before "improved stability"

Col. 5, Line 17, "be even" should read --even be--

Col. 5, Line 19, "reduced too" should read --reduced to--

Col. 5, Line 27, "be varying" should read --vary--

Col. 5, Line 33, "Firstly" should read --First--

This certificate supersedes the Certificate of Correction issued June 19, 2012.

Signed and Sealed this
Second Day of July, 2013

David J. Kappos
*Director of the United States Patent and Trademark Office*

CERTIFICATE OF CORRECTION (continued)
U.S. Pat. No. 7,686,249 B2

Col. 5, Line 34, "dimensions" should read --dimension--

Col. 5, Line 40, insert --,-- between "stretch forming"

Col. 5, Line 40, "subsequently" should read "subsequent"

Col. 5, Line 55, insert --stress-- before "fatigue"

In the Claims:

Col. 6, Line 17, insert -- - -- between "stretch forming"

Col. 6, Line 18, "subsequently" should read "subsequent"

Col. 6, Line 18, insert -- - -- between "stretch forming"

Col. 6, Line 22, delete "," after "region"